United States Patent
Tachikawa et al.

(10) Patent No.: US 8,111,303 B2
(45) Date of Patent: Feb. 7, 2012

(54) ALBUM CREATING APPARATUS AND METHOD

(75) Inventors: Kimiko Tachikawa, Tokyo (JP); Shinsuke Zetsu, Tokyo (JP); Hideaki Yoshihara, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 532 days.

(21) Appl. No.: 12/224,781

(22) PCT Filed: Dec. 5, 2006

(86) PCT No.: PCT/JP2006/324628
§ 371 (c)(1),
(2), (4) Date: Jan. 13, 2009

(87) PCT Pub. No.: WO2007/102265
PCT Pub. Date: Sep. 13, 2007

(65) Prior Publication Data
US 2009/0225191 A1    Sep. 10, 2009

(30) Foreign Application Priority Data
Mar. 7, 2006 (JP) .................................. 2006-061769

(51) Int. Cl.
*H04N 5/76* (2006.01)

(52) U.S. Cl. .................. 348/231.2; 348/231.3; 386/200; 386/224

(58) Field of Classification Search ............... 348/231.2, 348/231.3, 231.7; 386/200, 224
See application file for complete search history.

(56) References Cited

U.S. PATENT DOCUMENTS

| | | | |
|---|---|---|---|
| 6,222,947 B1 | 4/2001 | Koba | |
| 7,477,805 B2 * | 1/2009 | Ohtsuka et al. | 382/305 |
| 2002/0089516 A1 * | 7/2002 | Sobol | 345/620 |
| 2002/0103813 A1 * | 8/2002 | Frigon | 707/104.1 |
| 2004/0109587 A1 * | 6/2004 | Segawa et al. | 382/115 |
| 2004/0135904 A1 * | 7/2004 | Shiota et al. | 348/231.99 |
| 2005/0013599 A1 * | 1/2005 | Nakanishi et al. | 396/2 |
| 2005/0111737 A1 | 5/2005 | Das et al. | |
| 2006/0139371 A1 * | 6/2006 | Lavine et al. | 345/620 |

FOREIGN PATENT DOCUMENTS

| | | |
|---|---|---|
| JP | 10-293856 A | 11/1998 |
| JP | 2001-331704 A | 11/2001 |

(Continued)

*Primary Examiner* — Tuan Ho
*Assistant Examiner* — Kent Wang
(74) *Attorney, Agent, or Firm* — Birch, Stewart, Kolasch & Birch, LLP

(57) ABSTRACT

An album creating apparatus is provided to insert a title appropriate for the timing at which the image stored in the album is captured. The album creating apparatus includes: an image acquiring section for acquiring a plurality of images in association with image capturing times; a reference time acquiring section for acquiring a reference time indicative of the time and date of a main event in an album; an image capturing timing specifying section for specifying an image capturing timing indicative of a period for the reference time acquired by the reference time acquiring section, which includes the image capturing time and dates of the plurality of images acquired by the image acquiring section; a title determining section for determining a title to be inserted into the album based on the image capturing timing specified by the image capturing timing specifying section; and an album creating section for creating the album by laying out the title determined by the title determining section and the plurality of images acquired by the image acquiring section.

9 Claims, 10 Drawing Sheets

FOREIGN PATENT DOCUMENTS

| | | |
|---|---|---|
| JP | 2003-18388 A | 1/2003 |
| JP | 2004-213129 A | 7/2004 |
| JP | 2004-264868 A | 9/2004 |
| JP | 2005-190401 A | 7/2005 |
| WO | WO-2004/055696 A2 | 7/2004 |

* cited by examiner

```
Name          : Nana
File          : DSC0011.jpg
Position      : Left                  ~502
Casting       : Hero
Date of Birth : 2001.11.15
```

```
Name          : ——
File          : DSC0011.jpg
Position      : Right                 ~504
Casting       : Mother
Date of Birth : ——————
```

```
Name          : ——
File          : DSC0021.jpg
Position      : Right                 ~506
Casting       : Father
Date of Birth : ——————
```

| TIMING | CHARACTER STRING |
|---|---|
| -1~1 | Bloom |
| 2~5 | Hey! |
| 6~9 | Vivid |
| 0~5 | Seasons |
| ⋮ | ⋮ |

| COLOR GAMUT | EXPECTED VALUE OF AREA RATIO | AREA RATIO |
|---|---|---|
| COLOR GAMUT A | 8% | 10% |
| COLOR GAMUT B | 10% | 15% |
| COLOR GAMUT C | 3% | 12% |
| ... | ... | ... |

⇒ CHARACTERISTIC COLOR

ALBUM CREATING APPARATUS AND METHOD

TECHNICAL FIELD

The present invention relates to an album creating apparatus, an album creating method, and a program therefor. Particularly, the present invention relates to an album creating apparatus and an album creating method for creating an album, and a program for the album creating apparatus. The present application relates to and claims priority from a Japanese Patent Application No. 2006-061769 filed in Japan on Mar. 7, 2006, the contents of which are incorporated herein by reference for all purpose if applicable in the designated state.

BACKGROUND ART

A system for creating an album by receiving layout data created by laying out images by a customer who desires to create an album has been disclosed as, for example, in Japanese Patent Application Publication No. 2001-331704. In this art, the customer lays out images in an album and creates the album based on layout data created by laying out the images by the customer so that the album what the customer wants can be created. On the other hand, an image extracting method for efficiently extracting the predetermined number of images among a large amount of image data has been disclosed as, for example, in Japanese Patent Application Publication No. 2004-264868.

DISCLOSURE OF THE INVENTION

Problems to be Solved by the Invention

However, in the above-described former related art, the customer has to lay out images as checking the images one by one. Therefore, it may take a long time and a large amount of labor to create the album. Additionally, for a system that an album creator receives images from a customer to create an album, it is difficult that the customer accurately impart information on the main character and side characters in the images to the album creator. Therefore, it may be difficult for the album creator to create an album with an appropriate design dependent on the persons shown on the images. Meanwhile, as for the method disclosed in the above-described latter related art that an evaluated value for each image is inputted, it is difficult to create an album by extracting flexibly images for various events and also by extracting flexibly images based on the main character in the album.

Thus, the object of the present invention is to provide an album creating apparatus, an album creating method, and a program therefor which are capable of solving the problem accompanying the conventional art. The above and other advantages can be achieved by combining the features recited in independent claims. Then, dependent claims define further effective specific example of the present invention.

Means for Solving the Problems

In order to solve the above described problems, a first aspect of the present invention provides an album creating apparatus. The album creating apparatus includes: an image acquiring section for acquiring a plurality of images in association with image capturing time and dates; a reference time acquiring section for acquiring a reference time indicative of the time and date of a main event in an album; an image capturing timing specifying section for specifying the image capturing timing indicative of a period for the reference time acquired by the reference time acquiring section, which includes the image capturing time and dates of the plurality of images acquired by the image acquiring section; a title determining section for determining a title to be inserted into the album based on the image capturing timing specified by the image capturing timing specifying section; and an album creating section for creating the album by laying out the title determined by the title determining section and the plurality of images acquired by the image acquiring section.

The album creating apparatus may further include a specified subject information acquiring section for acquiring specified subject information including the birthday of the main character in the album. The reference time acquiring section may acquire the birthday of the main character included in the specified subject information acquired by the specified subject information acquiring section as a reference time indicative of the timing of the main event in the album.

The album creating apparatus may further include a title storage section for storing character strings used for titles inserted into the album in association with the image capturing timing. The title determining section may determine the title to be inserted into the album using the character strings stored in the title storage section in association with the image capturing timing specified by the image capturing timing specifying section.

The album creating apparatus may further include an image classification section for classifying the plurality of images acquired by the image acquiring section into each page of the album. The image capturing timing specifying section may specify the image capturing timing indicative of a period for the reference time acquired by the reference time acquiring section. The title determining section may determine a title to be inserted into each page of the album based on the image capturing timing specified by the image capturing timing specifying section. The album creating section may create an album by laying out the title determined by the title determining section into each page of the album.

The album creating apparatus may further include a template storage section for storing a template having image layout frames into which images should be laid out, a color pallet storage section for storing a color pallet including a plurality of colors used for the template of the album in association with the image capturing timing and a color pallet selecting section for selecting the color pallet stored in the color pallet storage section in association with the image capturing timing specified by the image capturing timing specifying section. The album creating section may apply the plurality of colors included in the color pallet selected by the color pallet selecting section.

The album creating apparatus may further include a specified subject information acquiring section for acquiring specified subject information including the image of the main character in the album, a main character image determining section for determining whether the plurality of images acquired by the image acquiring section includes the main character by comparing the plurality of images acquired by the image acquiring section with the image of the main character acquired by the specified subject information acquiring section, a characteristic color extracting section for extracting a characteristic color among a plurality of colors included in the image determined by the main character image determining section as that the main character is included therein, an applied color storage section for storing colors included in the color pallet stored in the color pallet storage section in association with a color range and a color used selecting section for selecting colors stored in the applied color storage section in association with the color range including the characteristic color extracted by the characteristic color extracting section. The album creating section may apply the color selected by the color used selecting section to the title determined by the title determining section.

A second aspect of the present invention provides an album creating method. The album creating method includes the steps of: acquiring a plurality of images in association with image capturing time and dates; acquiring a reference time indicative of the time and date of a main event in an album; specifying the image capturing timing indicative of a period for the reference time acquired in the reference time acquiring step, which includes the image capturing time and dates of the plurality of images acquired in the image acquiring step; determining a title to be inserted into the album based on the image capturing timing specified in the image capturing timing specifying step; and creating the album by laying out the title determined in the title determining step and the plurality of images stored in the image storing step.

A third aspect of the present invention provides a program for an album creating apparatus for creating an album. The program causes the album creating apparatus to function as: an image acquiring section for acquiring a plurality of images in association with image capturing time and dates; a reference time acquiring section for acquiring a reference time indicative of the time and date of a main event in an album; an image capturing timing specifying section for specifying the image capturing timing indicative of a period for the reference time acquired by the reference time acquiring section, which includes the image capturing time and dates of the plurality of images acquired by the image acquiring section; a title determining section for determining a title to be inserted into the album based on the image capturing timing specified by the image capturing timing specifying section; and an album creating section for creating the album by laying out the title determined by the title determining section and the plurality of images acquired by the image acquiring section.

A fourth aspect of the present invention provides an album creating apparatus. The album creating apparatus includes: an image acquiring section for acquiring a plurality of images in association with image capturing time and dates; a specified subject information acquiring section for acquiring specified subject information including a specified subject image being an image of a subject related to the main character in an album at a reference time indicative of the time and date of a main event in the album and a time before the reference time; a pre-image selecting section for selecting the image acquired by the image acquiring section in association with an image capturing time and date before the reference time based on the image capturing time and dates of the plurality of images acquired by the image acquiring section and the reference time acquired by the specified subject information acquiring section; a specified subject image determining section for determining whether the image selected by the pre-image selecting section includes the subject related to the main character by comparing the image selected by the image selecting section with the specified subject image acquired by the specified subject information acquiring section; and an album creating section for creating the album with emphasizing the image determined by the specified subject image determining section as that the subject related to the main character is included therein.

The specified subject information acquiring section acquires specified subject information including the specified subject image being an image of the subject related to the main character in the album at the reference time indicative of the time and date of the main event in the album and a time after the reference time. The album creating apparatus may further include a post-image selecting section for selecting the image acquired by the image acquiring section in association with an image capturing time and date after the reference time based on the image capturing time and dates of the plurality of images acquired by the image acquiring section and the reference time acquired by the specified subject information acquiring section. The specified subject image determining section may determine whether the image selected by the post-image selecting section includes any subject related to the main character by comparing the image selected by the post-image selecting section with the specified subject image acquired by the specified subject information acquiring section. The album creating section may create the album with emphasizing the image determined by the specified subject image determining section as that the subject related to the main character is included therein.

The specified subject information acquiring section may acquire specified subject information including the image of the parent of the main character and the birthday of the main character. The pre-image selecting section may select the image acquired by the image acquiring section in association with an image capturing time and date before the birthday of the main character based on the image capturing time and dates of the plurality of images acquired by the image acquiring section and the birthday of the main character acquired by the specified subject information acquiring section. The specified subject image determining section may determines whether the image selected by the pre-image selecting section includes the parent of the main character by comparing the image selected by the pre-image selecting section with the image of the parent of the main character acquired by the specified subject information acquiring section. The album creating section may create an album with emphasizing the image determined by the specified subject image determining section as that the parent of the main character is included therein.

The specified subject information acquiring section may further acquire the image of the main character. The album creating apparatus further includes a post-image section may select for selecting the image acquired by the image acquiring section in association with an image capturing date after the birthday of the main character and a main character image determining section for determining whether the image selected by the post-image selecting section includes the main character by comparing the image selected by the post-image selecting section with the image of the main character acquired by the specified subject acquiring section. The album creating section may create an album with emphasizing the image determined by the specified subject image determining section as that the main character is included therein.

The album creating section may create an album by determining a trimming range in which a characteristic portion of the subject related to the main character is emphasized in the image determined by the specified subject image determining section as that the subject related to the main character is included therein and using a trimming image obtained by trimming the image by the determined trimming range.

The specified subject information acquiring section may acquire specified subject information including the image of the mother of the main character in the album and the birthday of the main character. The pre-image selecting section may select the image acquired by the image acquiring section in association with an image capturing time and date within a predetermined period before the birthday of the main character based on the image capturing time and dates of the plurality of images acquired by the image acquiring section and the birthday of the main character acquired by the specified subject information acquiring section. The specified subject image determining section may determine whether the image selected by the pre-image selecting section includes the mother of the main character by comparing the image selected by the pre-image selecting section with the image of the mother of the main character acquired by the specified subject information acquiring section. The album creating section may create an album by determining a trimming range in which the belly of the mother of the main character is emphasized in the image determined by the specified subject image determining-section as that the mother of the main character is included therein and using a trimming image obtained by trimming the image by the determined trimming range.

The album creating section may select an image in which the characteristic portion of the subject related to the main character is located at the center thereof among the images determined by the specified subject image determining section as that the subject related to the main character is included therein and use the selected image to create an album.

The specified subject information acquiring section may acquire specified subject information including the image of the main character in the album and the image of the mother of the main character, and the birthday of the main character. The pre-image selecting section may select the image acquired by the image acquiring section in association with an image capturing time and date within a predetermined period before the birthday of the main character based on the image capturing time and dates of the plurality of images acquired by the image acquiring section and the birthday of the main character acquired by the specified subject information acquiring section. The specified subject image determining section may determine whether the image selected by the pre-image selecting section includes the mother of the main character by comparing the image selected by the pre-image selecting section with the image of the mother of the main character acquired by the specified subject information acquiring section. The album creating section may select an image in which the belly of the mother of the main character is located at the center thereof among the images determined by the specified subject image determining section as that the mother of the main character is included therein and use the selected image to create an album.

A fifth aspect of the present invention provides an album creating method. The album creating method includes the steps of: acquiring a plurality of images in association with image capturing time and dates; acquiring specified subject information including a specified subject image being an image of a subject related to the main character in an album at a reference time indicative of the time and date of a main event in the album and a time before the reference time; selecting the image acquired in the image acquiring step in association with an image capturing time and date before the reference time based on the image capturing time and dates of the plurality of images acquired in the image acquiring step and the reference time acquired in the specified subject information acquiring step; determining whether the image selected in the pre-image selecting step includes the subject related to the main character by comparing the image selected in the image selecting step with the specified subject image acquired in the specified subject information acquiring step; creating the album with emphasizing the image determined in the specified subject image determining step as that the subject related to the main character is included therein.

A sixth aspect of the present invention provides a program for the album creating apparatus for creating an album. The program causes the album creating apparatus to function as: an image acquiring section for acquiring a plurality of images in association with image capturing time and dates; a specified subject information acquiring section for acquiring specified subject information including a specified subject image being an image of a subject related to the main character in an album at a reference time indicative of the time and date of a main event in the album and a time before the reference time; a pre-image selecting section for selecting the image acquired by the image acquiring section in association with an image capturing time and date before the reference time based on the image capturing time and dates of the plurality of images acquired by the image acquiring section and the reference time acquired by the specified subject information acquiring section; a specified subject image determining section for determining whether the image selected by the pre-image selecting section includes the subject related to the main character by comparing the image selected by the image selecting section with the specified subject image acquired by the specified subject information acquiring section; and an album creating section for creating the album with emphasizing the image determined by the specified subject image determining section as that the subject related to the main character is included therein.

Here, all necessary features of the present invention are not listed in the summary of the invention. The sub-combinations of the features may become the invention.

EFFECT OF THE INVENTION

According to the present invention, an title appropriate for the time at which the image to be used in the album is captured can be inserted into the album.

BEST MODE FOR CARRYING OUT THE INVENTION

Hereinafter, the present invention will now be described through preferred embodiments. The embodiments do not limit the invention according to claims and all combinations of the features described in the embodiments are not necessarily essential to means for solving the problems of the invention.

FIG. 1 shows an example of environment for the usage of an album creating apparatus 100 according to an embodiment of the present invention. An album provision system 130 includes the album creating apparatus 100, a communication line 150, an image capturing apparatus 140 and a customer DB 170. The album creating apparatus 100 provides a function for receiving images captured by a user 190 using the image capturing apparatus 140 and creating an album 180 provided to the user 190. The album creating apparatus 100 includes an image input device 110 and an album creating device 120. Here, the album 180 may be a book such as a photo collection on which a plurality of images are printed and also may be an electronic album that a plurality of images are electrically recorded on an electronic medium such as a CD-ROM, a DVD and a hard disk.

Capturing any image by an instruction from the user 190, the image capturing apparatus 140 acquires the time at which the image is captured. Then, the image capturing apparatus 140 tags the acquired image with the captured image capturing time as tag information and records the same on a recording medium 160 such as a semiconductor memory. Then, the image input device 110 acquires the image captured by the image capturing apparatus 140 from the recording medium 160. At this time, the image input device 110 acquires the images of persons shown on the album, such as the main character of the album and the parent of the main character by causing the user 190 to designate the position for each person on the image. Additionally, the image input device 110 causes the user 190 to input the birthday of the main character. Here, the image input device 110 may acquire images used for the album, the images of persons and the birthday of the main character through the communication line 150 such as Internet and LAN.

Then, the album creating device 120 acquires images used for the album, the images of persons and the birthday of the main character from the image-input device 110 through the communication line 150. Then, the album creating device 120 lays out the received images in each page of the album and outputs the same by a printer and a display as the album 180. At this time, the album creating device 120 specifies the age range of the main character for the period over which the images used for the album 180 are captured by specifying the age of the main character when the image is captured. Then, the album creating device 120 creates the album 180 with the layout dependent on the specified age range.

For example, the album creating device 120 provides a title dependent on the age range to the album 180. For example, the album creating device 120 provides a title "Bloom" to the album 180 when the age range is within −1 year old (one year ago of the birthday) to one year old. Here, the album creating device 120 lays out images by allocating the images into each page mainly in the order corresponding to the image capturing times. Then, the album creating device 120 may determine the title for each page of the album 180 based on the age range for the period over which the image for each page is captured. Additionally, the album creating device 120 may process images dependent on the age range. For example, the age range is within −1 year old (one year ago of the birthday) to one year old, the album creating device 120 applies color such as pink being a cute color to the album 180. Additionally, the album creating device 120 creates the album 180 using an image obtained by picking up the main character from images captured after the main character was born and trimming the same. Additionally, the album creating device 120 creates the album 180 using an images obtained by picking up the parents of the main character from the image captured before the main character was born and trimming the same. Further, the album creating device 120 lays out in the album 180 the image obtained by zooming on the belly of the mother of the main character from the image before the main character was born and trimming the same. Thereby the album creating device 120 can create the album with a layout appropriate for the age range of the main character.

The image input device 110 may be a terminal of a kiosk provided in various shops 152 such as a print-shop, a consumer-electronics mass merchandise store, a station and a street corner. Additionally, the album creating device 120 may be provided on such as an album manufacturing facility 154. The album creating device 120 may be a device for creating the album 180 printed, which includes a plurality of images and also may be a device for creating an electronic medium on which a plurality of images are recorded in order to view the images in the form of an album. Additionally, the album creating device 120 may be a device for generating album data to create the printed album 180 and album data to create an album electronically recorded. Here, the album creating device 120 may be a device for displaying a plurality of images on a screen at once. For example, the album creating apparatus 100 may be a personal computer, an electronic album apparatus and a HDTV. It has been described that the image input device 110 and the album creating device 120 cooperate to function as the album creating apparatus 100 in the present embodiment. However, one apparatus including the functions of the image input device 110 and the album creating device 120 can operate as the album creating apparatus 100, of course.

Here, the user 190 can introduce the album 180 to a plurality of users 195 in the album provision system 130. For example, the album creating device 120 records an album identification number for identifying the album 180 on the album 180 and provides the same to the user 190. Such album identification number is recorded on the customer DB 170 in association with the user identification number for identifying the user 190 being an orderer of the album. The album provision system 130 causes the other users 195 to view images captured by the image capturing apparatus 140 and the album 180 created by the album creating device 120 based on the captured image. For example, the album provisions system 130 may cause the other users 195 to view the image and the album 180 through the communication line 150. Also the album provision system 130 may causes the users 195 to view the image captured by the image capturing apparatus 140 and the album 180 created based on the captured image by bringing the same by the user 190 to the location of the other users 195. In the album provision system 130, the images and the album 180 created by the images may be arranged on a photo shop in the form of allowing to be viewed by the other users 195.

Then, the user 190 explains in detail an order process through which the album 180 is ordered by selecting the images captured by the image capturing apparatus 140. Here, providing the album 180 to the user 190, the album creating apparatus 120 may provide to the user 190 a recording medium such as a CD-ROM and a DVD-ROM on which the images used to create the album 180, the album 180 and a guide program which describes how to order by using the album provision system 130 are recorded. The user 190 can easily introduce to the user(s) 195 how to order the album by using the album provision system 130 by delivering the recording medium to the user(s) 195. Here, it is preferred that the guide program is programmed to describe a process from ordering to receiving the album 180 by using the images used to create the album 180.

According to the album provision system 130, the user(s) 195 can practically visualize(s) a finishing state of the album 180 actually created from the images actually used by viewing the album 180 ordered by the user 190 close relation with the user 195. At this time, if an image captured by the user 190 who has no camera technique is finished good, the user 195 more inclines to order the album. Thus, the album provision system 130 can effectively prompt the user 195 who hesitates to order an album by using the album provision system 130.

Here, when the user 195 orders the album, the image input device 110 causes the user 195 to input the album identification number recorded on the album 180 which is viewed by the user 195. For example, when the user 195 orders the album, the user 195 fills in an order sheet. The order sheet has an introduction album entry field into which the album identification number of the album 180 is inputted by the user 195. The album provision system 130 causes the user 195 to input the album identification number of the album 180 to order to create the album. At this time, the album provision system 130 acquires user identification information stored in the customer DB 170 in association with the album identification information inputted into the introduction album entry field and provides an incentive to the user identified by the user identification information acquired. Thereby the user 190 more inclines to introduce how to order an album by using the album provision system 130 to the user 195. Additionally, the album provision system 130 may provide to the user 195 who filled the album identification information in the introduction album entry field various services such as reducing the price for creating the album.

Here, creating the album 180, the album creating apparatus 120 causes the customer DB 170 to store design information on creating the album 180 in association with the album identification information to identify the album 180. Then, creating the album using the images provided by the user 195, the album creating device 120 acquires the design information stored in the customer DB 170 in association with the album identification information inputted into the introduction album entry field. Then, the album creating device 120 creates the album by arranging the images provided from the user 195 with the design indicated by the acquired design information and provides the same to the user 195. Thereby the album provision system 130 can provide to the user 195 an album with the design same as that of the album 180 which is presented to the user 195 by the user 190. Accordingly, the user 195 can previously prevent the finished album which is received from being different from the look and feel of the album 180 when it is introduced by the user 190. Here, the design information may be theme information indicative of the whole theme of the album 180. Additionally, the design information may be layout information indicative of the image layout and color arrangement information on a color pallet used to arrange colors of the album 180.

As described above, the album provision system 130 can provide to the user 190 an album created by using the titles appropriate for the main character and the images appropriately processed. Additionally, the album provision system 130 can cause the user 190 who has ordered an album by using the album provision system 130 to explain how to order an album to the user 195 who have not yet ordered any album so as to effectively prompt the user 195 to order an album.

FIG. 2 shows an example of block configuration of the album creating apparatus 100. The image input device 110 includes a specified subject information acquiring section 200 and an image acquiring section 202. The album creating device 120 includes a specified subject information acquiring section 200, an image storage section 210, a reference time acquiring section 220, an image capturing time specifying section 222, a color pallet selecting section 230, a color pallet storage section 232, a color used selecting section 234, an applied color storage section 236, a characteristic color extracting section 238, a pre-image selecting section 240, a specified subject image determining section 242, a post-image selecting section 250, an image classification section 260, a title determining section 270, a title storage section 272, a template storage section 280 and an album creating section 290.

The image acquiring section 202 acquires a plurality of images in association with the image capturing times. For example, the image acquiring section 210 acquires an image with which the image capturing time by the image capturing apparatus 40 such as a digital camera is tagged as tag information. Here, the image capturing time includes the year, the month, the date and the time at which the image is captured. That is to say, the image capturing time in the present embodiment may be an image capturing time and date. Then, the image storage section 210 stores a plurality of images acquired by the image acquiring section 202 in association with the image capturing times acquired by the image acquiring section, respectively.

The specified subject information acquiring section 200 acquires specified subject information including the image of the main character in the album. Additionally, the specified subject information acquiring section 200 acquires specified subject information including the specified subject image being an image of the subject related to the main character in the album at the reference time indicative of the time and date of the main event in the album and the time before the reference time. Specifically, the specified subject information acquiring section 200 acquires specified subject information including the birthday of the main character in the album. Additionally, the specified subject information acquiring section 200 acquires specified subject information including the image of the parent of the main character in the album and the birthday of the main character. The spec specified subject information including the images of the main character of the album, the mother of the main character, and the birthday of the main character.

The reference time acquiring section 220 acquires the reference time indicative of the time and date of the main event in the album. Specifically, the reference time acquiring section 220 acquires the birthday of the main character included in the specified subject information acquired by the specified subject information acquiring section 200 as the reference time indicative of the timing of the main event in the album.

The image capturing time specifying section 222 specifies the image capturing timing indicative of a period for the reference time acquired by the reference time acquiring section 220, which includes the image capturing times of the plurality of images stored in the image storage section 210. For example, the image capturing time specifying section 222 specifies the age of the main character at the time at which each of the plurality of images stored in the image storage section 210 is captured and specifies the age range as the image capturing timing indicative of the period for the birthday of the main character. Then, the title determining section 270 determines the title inserted into the album based on the image capturing timing specified by the image capturing timing specifying section 222. Then, the album creating section 290 lays out the title determined by the title determining section 270 and the plurality of images stored in the image storage section 210 to create the album.

The title storage section 272 stores character strings used for the title inserted into the album in association with the image capturing timing. For example, the title storage section 272 stores a character string "Hey!" for the age range from two years old to five years old, and a character string "Vivid" for the age range from six years old to nine years old. Then, the title determining section 270 determines a title inserted into the album by using the character strings stored in the title storage section in association with the image capturing timing specified by the image capturing timing specifying section 222. Therefore, the album creating apparatus 100 can provide the title appropriate for the age of the main character to the album.

Additionally, the image classification section 260 classifies the plurality of images stored in the image storage section 210 into each page of the album. Then, the image capturing timing specifying section 222 specifies the image capturing timing indicative of a period for the reference time acquired by the reference time acquiring section 220, which includes the image capturing times of the plurality of images classified into each page by the image classification section 260. Then, the title determining section 270 determines the title inserted into each page of the album based on the image capturing timing specified by the image capturing timing specifying section 222. Then, the album creating section 290 lays out the titles determined by the title determining section 270 into each page of the album to create the album. Thereby the album creating apparatus 100 can appropriately determine the title for each page according to the image capturing timing at which the image included in each page is captured.

The template storage section 280 stores a template having image layout frames into which images should be fitted. Then, the color pallet storage section 232 stores a color pallet including a plurality of colors used for the template of the album in association with the image capturing timing. For example, the color pallet storage section 232 stores for the age range from zero year old to five years old a color pallet including colors having brightness and saturation higher than those of colors included in the color pallet stored for the age range more than fifty years old. Then, the color pallet selecting section 230 selects the color pallet stored in the color pallet storage section 232 in association with the image capturing timing specified by the image capturing timing specifying section 222. Then, the album creating section 290 applies the plurality of colors included in the color pallet selected by the color pallet selecting section 230 to the template of the album. For example, the album creating section 290 applies colors included in the color pallet selected by the color pallet selecting section 230 to the title of the album, the background and the image layout frames for each page. Thereby the album creating apparatus 100 can create the album with the color arrangement appropriate for the age of the main subject.

Here, the applied color storage section 236 stores colors included in the color pallet stored in the color pallet storage section 232 in association with the color range. For example, the applied color storage section 236 stores the colors included in the color pallet in association with the magnitude of difference among the colors each other in the color pallet. Specifically, the applied color storage section 236 stores the colors included in the color pallet in association with the color gamut including the colors. Then, the specified subject image determining section 242 determines whether the plurality of images stored in the image storage section 210 includes the main character by comparing the plurality of images stored in the image storage section 210 with the image of the main character acquired by the specified subject information acquiring section 200. Then, the characteristic color extracting section 238 extracts the characteristic color among a plurality of colors included in the image determined by the specified subject image determining section as that the main character is included therein. Then, the color used selecting section 234 selects the color stored in the applied color storage section 236 in association with the color range including the characteristic color extracted by the characteristic color extracting section 238. Then, the album creating section 290 applies color to the title determined by the title determining section 270 by using the color selected by the color used selecting section 234. Thereby the album creating apparatus 100 can select the color included in the color pallet, which is located within the color gamut including the characteristic color in the image including the main character and apply the same. Accordingly, the album creating apparatus 100 applies color by using the color close to the characteristic color of the main character and the color included in the color pallet so that the album with the color arrangement which is totally harmonized can be created.

Here, the pre-image selecting section 240 selects the image stored in the image storage section 210 in association with the image capturing time before the reference time based on the image capturing times of the plurality of images stored in the image storage section 210 and the reference time acquired by the specified subject information acquiring section 200. Specifically, the pre-image selecting section 240 selects the image stored in the image storage section in association with the image capturing time before the birthday of the main character based on the image capturing times of the plurality of images stored in the image storage section 210 and the birthday of the main character acquired by the specified subject information acquiring section 200. Then, the specified subject image determining section 242 determines whether the image selected by the image selecting section 240 includes any subject related to the main character by comparing the image selected by the pre-image selecting section with the specified subject image acquired by the specified subject information acquiring section 200. Specifically, the specified subject image determining section 242 determines whether the image selected by the pre-image selecting section 240 includes the parent of the main image by comparing the image selected by the pre-image selecting section 240 with the image of the parent of the main character acquired by the specified subject information acquiring section 240. Then, the album creating section 290 creates the album with emphasizing the image determined by the specified subject image determining section 242 as that any subject related to the main character is included therein. Specifically, the album creating section creates the album with emphasizing the image determined by the specified subject image determining section 242 as that the parent of the main character is included therein. Thereby the album creating apparatus 100 can lay out the parent of the main character at the center of the page consisting of images captured before the main character was born to create the album.

Then, the post-image selecting section 250 selects the image stored in the image storage section 210 in association with the image capturing time after the reference time based on the image capturing times of the plurality of images stored in the image storage section 210 and the reference time acquired by the specified subject information acquiring section 200. Specifically, the post-image selecting section 250 selects the image stored in the image storage section 210 in association with the image capturing time after the birthday of the main character based on the image capturing times of the plurality of images stored in the image storage section 210 and the image capturing time after the birthday of the main character. Then, the specified subject image determining section 242 determines whether the image selected by the pre-image selecting section 240 includes any subject related to the main character by comparing the image selected by the post-image selecting section 250 with the specified subject image acquired by the specified subject information acquiring section 200. Specifically, the specified subject image determining section 242 determines whether the image selected by the post-image selecting section 250 includes the main character by comparing the image selected by the post-image selecting section with the image of the main character acquired by the specified subject information acquiring section 200. Then, the album creating section 290 creates an album with emphasizing the image determined by the specified subject image determining section 242 as that the subject related to the main character is included therein. Specifically, the album creating section 290 creates an album with emphasizing the image determined by the specified subject image determining section 242 as that the main character is included therein. Therefore, the album creating apparatus 100 can create an album with the layout in which the main character is centrically located when pages including images captured after the main character was born includes images on which the main character is shown.

The pre-image selecting section 240 selects the image stored in the image storage section 210 in association with the image capturing time within a predetermined period before the birthday of the main character based on the image capturing times of the plurality of images stored in the image storage section 210 and the birthday of the main character acquired by the specified subject information acquiring section 200. For example, the pre-image selecting section 240 selects the image stored in the image storage section 210 in association with the image capturing time within the period from five months before the birthday of the main character to the birthday of the main character. Then, the specified subject image determining section 242 determines whether the image selected by the pre-image selecting section 240 includes the mother of the main character by comparing the image selected by the pre-image selecting section 240 with the image of the mother of the main character acquired by the specified subject information acquiring section 200. Then, the album creating section 290 determines a trimming range in which the belly of the mother of the main character is emphasized in the image determined by the specified subject image determining section 242 as that the mother of the main character is included therein and creates an album using a trimming image obtained by trimming the image by the determined trimming range. Thus, the album creating section 290 determines the trimming range in which the characteristic portion of the subject related to the main character in the image determined by the specified subject image determining section 242 as that the subject related to the main character is included therein and creates an album using a trimming image obtained by trimming the image by the determined trimming range. Additionally, the album creating section 290 may select the image in which the belly of the mother of the main character is located at the center thereof among the images determined by the specified subject image determining section 242 as that the mother of the main character is included therein and create an album using the selected image. Thus, the album creating section can select the image in which the characteristic portion of the subject related to the main character is located at the center thereof among the images determined by the specified subject image determining section as that the subject related to the main character is included therein and create an album using the selected image. Thereby the album creating apparatus 100 can create an album with the layout in which the belly of the mother is centrically located by using the image including the mother captured at the timing for which the mother had the main character in her belly. As described above, the album creating section 290 creates an album by using the trimming image in which the characteristic portion of the subject related to the main character is emphasized or an image in which the characteristic portion is emphasized. Here, the album creating section 290 previously stores the characteristic portion to be emphasized in the subject related to the main character in association with the relevance between the related person and the main character. Specifically, the album creating section 290 stores the belly as the characteristic portion in association with the relevance indicative of the mother of the main character. Additionally, the specified subject information acquiring section 200 may further acquire the relevance between the related subject and the main character. Then, the album creating section 290 may extract a region corresponding to the characteristic portion previously stored in association with the relevance acquired by the specified subject information acquiring section 200 and create an album by using the trimming image in which the extracted region is emphasized or an image in which the region is emphasized.

As described above, the album creating apparatus 100 can create an album with a desired layout in which a desired title appropriate for the age of the main character is used.

FIG. 3 shows an example of template stored in the template storage section 280. A template 301 indicates an example of template for the back cover and the front cover of an album. Templates 302-305 indicate examples of templates for facing pages. Each image layout frame such as 311, 312 and so forth shown in the template defines information indicative of the casting of the person to be shown on the image fitted into the image layout frame.

Here, the information indicative of the casting of the person in the album is included in the specified subject information acquired by the specified subject information acquiring section 200. Specifically, the specified subject information includes Casting field indicative of the casting of the person in the album. For example, in the Casting field, "Hero", "father", "Mother" and "Friend" indicative of the main character, the father of the main character, the mother of the main character and the friend of the main character, respectively are defined. The specified subject information includes information indicative of the image of the person. The image of the person is associated with the casting information based on the specified subject information. Then, the album creating section 290 fits the image including the person indicated by the casting information defined for the image layout frame into the image layout frame. Here, the specified subject information will be described later with reference to FIG. 4 and FIG. 5.

Specifically, it is defined that the image including the person of which Casting field is "Hero" is fitted into the image layout frames 311 and 312 shown in the template 301. It is defined that each image including the person of which Casting field is "relatives" is fitted into the image layout frames 311-334. Here, the relatives is the generic name of the casting information indicative of a family including Father, Mother, Brother and Sister. Additionally, It is defined that each image including the person of which Casting field is "Mother" is fitted into the image layout frames 342 and 343.

Here, the specified subject image determining section 242 extracts an image of the main character from an image region within a predetermined range from the position of Position field of the specified subject information in the image of which file name is indicated by File field of the specified subject information indicating that the Casting field is "Hero". Then, when the image selected by the post-image selecting section 250 includes the subject corresponding to the image of the main subject at more than a predetermined degree by matching the subject included in the image selected by the post-image selecting section 250 with the image of the main subject, the specified subject image determining section. In the same way, the specified subject image determining Section 242 can select the image including the father or the mother among the images selected by the pre-image selecting section 240 based on the specified subject information indicating that the Casting field is Father or Mother. The album creating section 290 selects the image including the person having the Casting field including the casting information defined in each image layout frame among the images stored in the image storage section 210.

Then, the album creating section 290 selects the image among the images determined by the specified subject image determining section 242 as that the main character is included therein and fits the same into the image layout frames such as 311, 312 and so forth determined that the Hero is fitted thereinto. Additionally, the album creating section 290 selects the image among the images determined by the specified subject image determining section 242 as that the mother is included therein and fits the same into the image layout frames such as 342, 343 and so forth defined that the image including Mother is fitted thereinto. Here, the album creating section 290 can determine whether the image stored in the image storage section 210 includes any person having Casting information other than Hero and Mother based on the specified subject information and lay out the image according to the Casting information defined for each image layout frame.

Title information including character arrangement indicative of an album title and a page title is defined in the template. The title information may previously define a part of the content of the album title and the page title. For example, positions 391 and 392 at which the title of the back cover and the front cover shown in the template 301 is located are defined. Then, the album creating section 290 inserts the title into the album by fitting the character string determined by the title determining section 270 into the position indicated in the template 301. Here, the detailed operation determined by the title determining section 270 will be described later with reference to FIG. 6.

Additionally, the title information defined in the template includes character substituting information indicating that at least a part of the title should be substituted with field data included in the specified subject information. For example, each of the templates 303, 304 and 305 defines <Name>'s Family, right after <Name> was born, right after before <Name> was born, respectively as page titles. Text substituting information <Name> included in those titles indicates that it should be substituted with field data of the Name field of the specified subject information indicating that the Casting filed is Hero. The name of the person indicated by the specified subject information is stored in the Name field. Then, the album creating section 290 substitutes the text indicated by the text substituting information <Name> with field data of the Name field included in the specified subject information indicating that the Casting field is Hero to create each title. Thereby the album creating apparatus 100 can flexibly create the title dependent on the name of the designated person. As described above, the album creating apparatus 100 can flexibly create an album with an appropriate design according to the specified subject information designated by the user 190.

Here, the template 302 is an example of template which defines that a page constituting of the images including the main character is created. The template 303 is an example of template which defines that a page constituting of the images including the family is created. The template 304 is an example of template which defines that a page constituting of the images including the family, which at least includes the mother. The template 305 is an example of template which defines that a page constituting of the images including the family, which at least includes the main character and the mother. Here, the template 304 is an example of template of the page including no image which is captured after the main character was born. The template 305 is an example of template of the page including no image which is captured before the main character was born. In this case, the template storage section 280 may store the template including for each page composite information indicative of the timing at which the image laid out in the page of the album is captured. Then, the image classification section 260 may classify images stored in the image storage section into each page according to the composite information included in the template stored in the template storage section 280.

FIG. 4 shows an example of processing flow of acquiring specified subject information by the specified subject information acquiring section 200. As described above, the specified subject information is associated with the persons shown on the album, and is utilized in step of creating an album by the album creating apparatus, such as laying out images in the album and making a title. The specified subject information acquiring section 200 causes the user 190 to input casting information indicative of the casting role of a person included in the image in the album and acquires the same (S402). For example, the specified subject information acquiring section 200 causes the user 190 to input "Hero", "Father", "Mother", "Brother", "Sister" and "Friend" as casting information and acquires the same.

Then, the specified subject information acquiring section 200 displays a plurality of images stored in the image storage section 210 to present the same to the user 190 (S404). Then, the specified subject information acquiring section 200 causes the user 190 to select the image including the person having the casting role indicated by the casting information inputted in the S402 and acquire the same (S406). At this time, the specified subject information acquiring section 200 memorizes the file name of the selected image, for example. Then, the specified subject information acquiring section 200 causes the user 190 to input the position of the person in the image selected in the S406 and acquires the same (S408). For example, the specified subject information acquiring section 200 may cause the user 190 to push a button indicative of such as Left, Center and Right to input the position of the person. Then, the specified subject information acquiring section 200 determines whether the casting information inputted in the S402 is "Hero" (S410). Then, when it is determined in the S410 that the casting information is "Hero", the specified subject information acquiring section 200 acquires the name and the date of birth of the person from the user 190 (S412). Here, the date of birth is the birthday of the main character in the present embodiment.

Then, the specified subject information acquiring section 200 generates specified subject information including the casting information inputted in the S402, the name of the file selected in the S406, the position inputted in the S408, and the name and the birthday acquired in the S412(S414). Here, determining that the casting information is not "Hero" in the S410, the specified subject information acquiring section 200 shifts the process to the S414 and generates specified subject information including the casting information inputted in the S402, the name of the file selected in the S406 and the position inputted in the S408.

Then, the specified subject information acquiring section 200 presents whether the specified subject information of any other person to the user 190 and determines whether the casting information of any other person is inputted based on the input from the user 190 (S416). Determining in the S416 that the casting information of any other person is inputted, the process is shifted to the S402 and the specified subject information acquiring section 200 causes the user 190 to input the casting information of any other person. Determining in the S416 that the casting information of any other person is not inputted, the specified subject information acquiring section 200 ends the process.

As described above, the album creating apparatus 100 causes the user 190 to designate the person to be shown on the album and the casting role in the album to acquire the casting role of the person in the album. Therefore, the album creating apparatus 100 can appropriately determine the layout and title of the image in the album dependent on the casting role of the person in the album.

FIG. 5 shows an example of the content of specified subject information. Specified subject information 502, 504 and 506 indicate the main character, the brother of the main character and the friend of the main character in the album, respectively. The specified subject information 502, 504 and 506 have File field indicative of the file name of an image, Position field indicative of the position of the person in an image, Casting field indicative of casting information and Date of Birth indicative of the date of birth, respectively. The specified subject information of the main character includes the name and the date of birth which are private information, but the specified subject information of any person other than the main character does not include those private information. Thereby the user 190 does not need to input personal information of any person other than the main character. Therefore, even if data is peeked by the other person during inputting data for the specified subject information in a kiosk and also even if data is peeked over the communication line during inputting data for the specified subject information through the communication line such as Internet, the damage can be reduced. Additionally, for the specified subject information indicative of the main character, the specified subject information acquiring section 200 may encrypt the inputted private information to create specified subject information.

FIG. 6 is a table showing an example of character strings for titles stored in the title storage section 272. The title storage section 272 stores "Bloom", "Hey!", "Vivid" and "Seasons" in association with an age from −1 year old to one year old, an age from two years old to five years old and an age from six years old to nine year old, respectively. Here, the age from −1 year old to one year old means the period from one year ago of the date of birth to the birthday of one year old of the main character. Then, for the album created by the images captured for the age from −1 year old to one year old, the title determining section 270 determines a title using the character string "Bloom" stored in the title storage section 272 in association with the age. Then, the album creating section 290 inserts the character storing "Bloom" into the album title positions 391 and 392 defined in the template 301 of FIG. 3, for example. Thus, the album creating apparatus 100 can create album into which the appropriate title dependent on the age range of the main character at image-capturing is inserted. Here, the title determining section 270 may determine the title for each page by using character strings stored in the title storage section 272 in association with the image capturing timings of the images classified into each page by the image classification section 260.

Additionally, the title storage section 272 may store character strings used for the titles inserted into the album in association with the number of persons. For example, the title storage section 272 may store the title such as "Feam" in association with the number of persons more than ten. Then, the title determining section 270 may determine the title to be inserted into the album by using character strings stored in the title storage section in association with the number of persons (the number of casting roles) acquired by the specified subject information acquiring section. Additionally, the title storage section 272 may store character strings used for the titles in association with the ratio between the number of all kinds of casting information and the number of the specified kind of casting information. For example, the title storage section 272 may store the character strings for the titles in association with the family ratio being the ratio between the number of all kinds of casting information and the number of the type of casting information indicative of family. For example, the title storage section 272 stores "Family" in association with the family ratio 75%-100%. Additionally, the title storage section 272 stores "Group <Name>" in association with the family ratio 0%-20%. Further, the title storage section 272 may store "<Name> & Friends" in association with the ratio 75%-100% between the number of all kinds of casting information and the number of casting information indicative of friend. Here, the ratio between the number of all kinds of casting information and the number of the specified kind of casting information may be determined based on the number of the kinds of casting information included in the specified subject information inputted by the specified subject information acquiring section 200, and also may be determined based on the number of persons in the images included in the image storage section 210, which is counted for each kind of casting information. Additionally, the title storage section 272 can store character strings in association with various data included in casting information.

As described above, the album creating apparatus 100 can insert an appropriate album title or page titles based on various information such as casting information in the album included in the specified subject information.

FIG. 7 shows an example of extracting method of extracting the characteristic color by the characteristic color extracting section 238. The characteristic color extracting section 238 calculates for each color gamut a color area which is an area for region including a color for each of a plurality of color gamut (color•gamut A, B and C) in the image determined by the specified subject image determining section 242 as that the parent or the main character is included therein. Here, the color gamut means a color range indicated by each of a plurality of color space obtained by dividing the color space into the plurality of spaces. Here, the characteristic color extracting section 238 may calculate for each color gamut the number of pixels having color for each of the plurality of color gamuts as an index indicative of the area.

Then, the characteristic color extracting section 238 calculates for each of the plurality of color gamuts an area ratio between the calculated color area and the total area of the image. Additionally, the characteristic color extracting section 238 previously stores, for each of the plurality of color gamuts, the expected value of the area ratio indicative of an area ratio expected to be shown on the image. Here, the expected value of the area ratio is the expected value for each color gamut included in the average image, for example. The characteristic color extracting section 238 may calculate the area ratio for each image stored in the image storage section 210 and store for each color gamut the average value over the image with the calculated area ratio, for example.

Then, the characteristic color extracting section 238 calculates for each color gamut a characteristic degree being a ratio between the expected value of the area ratio and the calculated area ratio and extracts the color included in the color gamut having the maximum characteristic degree calculated as a characteristic color. In FIG. 7, the characteristic color extracting section 238 calculates 1.25, 1.5 and 4 as the characteristic degree of the color gamut A, B and C, respectively. Thus, the characteristic color extracting section 238 extracts the color gamut having the area ratio larger than the expected value as the characteristic color. Therefore, the characteristic color extracting section 238 can appropriately extract the characteristic color included in the image. Here, the characteristic color extracting section 238 may extract the characteristic color from the colors of the image region including the main character and the parent of the main character, and also may extract the characteristic color from the colors of the image region around the main character and the parent of the main character.

Here, the color palette storage section 232 stores a color pallet indicative of the combination of colors which is visually harmonized for human in association with the image capturing timings. For example, the color pallet storage section 232 stores the color pallet in the storage from same as a form of storing character strings by the title storage section 272 in association with the image capturing timings. Then, the color pallet selecting section 230 selects the color pallet stored in the color pallet storage section 232 in association with the image capturing timing specified by the image capturing timing specifying section 222. Additionally, the applied color storage section 236 stores each color included in the color pallet stored in the color pallet storage section 232 in association with a predetermined color range including the color. Then, the color used selecting section 234 selects the color included in the color pallet selected by the color pallet selecting section 230 in association with the color range including the characteristic color extracted by the characteristic color extracting section 238. Then, the album creating section 290 applies the color selected by the color pallet selecting section 230 to the title defined in each template, the background of each page and the image frames defined in the template. Therefore, the album creating apparatus 100 can create an album with a color arrangement having color combination visually harmonized, which includes the color visually close to the characteristic color.

FIG. 8 shows an example of trimming an image by the album creating section 290. When the specified subject image determining section 242 determines that an image 801 includes the mother of the main character, the album creating section 290 specifies the region including the belly of the mother from the image 801. For example, the album creating section 290 specifies the position of the head and the legs of the mother by pattern-matching the outline of the mother in the image 801 with a predetermined pattern of the head and legs. Then, the album creating section 290 specifies the points which divide the line connecting the specified positions of head and legs by a predetermined ratio. Then, the album creating section 290 specifies the specified position of points as the position of the belly of the mother. Additionally, the album creating section 290 specifies the position of the head of the mother, a direction from the head toward the body and the length of the head in the direction. Then, the album creating section 290 specifies as the position of the belly of the mother a position apart from the position of the head by a length obtained by multiplying the length of the head by a predetermined coefficient in the direction. Thus, the album creating section 290 creates a trimming image 802 including a predetermined range in which the specified position of the belly of the mother is located at the center thereof.

Here, the album creating section may create a trimming image 803 in which the center of gravity of the region of the mother is located at the center thereof. Additionally, the album creating section 290 may select an image in which the mother or the belly of the mother is located at the center thereof from images stored in the image storage section 210.

FIG. 9 shows an example of layout results 902, 904 and 906 by the album creating section 290. The layout result 902 indicates an example of layout result obtained by which the album creating section 290 fits images into image layout frames 331-335 defined in the template 303. According to the layout result 902, the image determined by the specified subject image determining section 242 as that the main character is included therein is fitted into the image layout frame 331. The album creating section 290 fits the image including a person having Casting information included in Family into the image layout frames 332-335 which are smaller than the image layout frame 331 and located around the image layout frame 331 in the page. Thus, the album creating section 290 can create a page with emphasizing the image including the main character.

Additionally, the album creating section 290 may generate a trimming image by trimming the image including the character in order to locate the main character at the center thereof and lay out the generated trimming image in the image frame 331. Additionally, the album creating section 290 may select an image to be fitted into the image layout frame such that the number of the main characters is more than the number of any person other than the main character. Further, the album creating section 290 may trim the image such that the area of the main character included in the image layout frames 331-335 included in the same page is larger than the area of the persons other than the main character, enlarge the obtained trimming image and fit the same into the image layout frame 331 of the main image.

The layout result 904 is an example of layout result obtained by which the album creating section 290 fits images into the image layout frames 341-343 defined in the template 304. The trimming image 802 obtained by trimming centrically the belly of the mother is fitted into the image layout frame 342 at the center of the page. The layout result 906 is an example of layout result obtained by which the album creating section 290 fits images into the image layout frames 351-353 defined in the template 305. A trimming image obtained by trimming centrically the main character is fitted into the image layout frame 352 at the center of the page.

As described above, the album creating apparatus 100 can reflect information including the specified subject information acquired by the specified subject information acquiring section 200 to create an album in various ways such as the album title, page titles, color arrangement of the pages and determination of the layout of images. Here, the album creating apparatus 100 has been descried according to the aspect that album creating apparatus 100 determines the titles inserted into the album and the trimming based on the reference time being the birthday of the main character. However, in the album creating apparatus 100, the reference time can be various timings other than the birthday of the main character. For example, the album creating apparatus 100, may acquire a reference time being the reference of various event, such as the date of marriage, the time and date of departure of a traveling, the time and date of entering a hospital, the time and date of automobile accident, the time of making a shot on goal and the time of slugging a home run, and determine a title and a trimming according to the acquired reference time. For example, when the image including the marriages is captured before the date of marriage, the album creating section may generate two trimming images obtained by trimming the image such that each of marriages is located at the center thereof. Additionally, the album creating section 290 may create a title including characters as "silver wedding" and "golden wedding" based on the time difference between the time and date of marriage and the image capturing time. Additionally, when the image is captured after the time and date of marriage, the album crating section 290 may create a trimming image obtained by trimming the image such that marriages are located at the center thereof. Additionally, when the same places are captured before/after the time and date of departure of a traveling, the album creating section 290 may create a trimming image for each image obtained by trimming the image such that each image has the similar composition. Additionally, the album creating section 290 may create a trimming image obtained by trimming the portion damaged by the accident from images including accident car captured before/after the time and date of automobile accident. Further, the album creating section 290 may create trimming images obtained by trimming a person who makes a shot on goal and a person who slugs a home run from the image captured before/after the time of making a shot on goal and the time of slugging a home run.

Here, the album creating apparatus 100 may acquire the above described reference time by causing the user 190 to input the same. For example, the reference time acquiring section 220 may cause the user 190 to designate an image captured proximate to the reference time and acquire the image capturing time of the designated image as the reference time.

FIG. 10 shows an example of the hardware configuration of the album creating apparatus 100. The album creating apparatus 10 includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM 1520 with a high transfer ratio. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the host controller 1582 to the hard disk drive 1540, the communication interface 1530 and the CD-ROM drive 1560 which are relatively high-speed input/output units. The hard disk drive 1540 stores the program and data used by the CPU 1505 in the album creating apparatus 10. The communication interface 1530 connects to a network communication device 1598 to transmit/receive programs and data. The CD-ROM drive 1560 reads the program or data from the CD-ROM 1595 and provides the same to the hard disk drive 1540 through the RAM 1520.

The ROM 1510, and the flexible disk drive 1550 and input/output chip 1570 which are relatively low-speed input/output units are connected to the input/output controller 1584. The ROM 1510 stores a boot program executed by the album creating apparatus 100 at activating and a program depending on the hardware of the album creating apparatus 100. The flexible disk drive 1550 reads the programs or data from a flexible disk 1590 and provides the same to the hard disk drive 1540 through the RAM 1520. The input/output chip 1570 connects various input/output units through the flexible disk drive 1550 and such as a parallel port, a serial port, a keyboard port and a mouse port.

The program executed by the CPU 1505 is stored in a recording medium, such as the flexible disk 1590, the CD-ROM 1595, or an IC card and provided by the user. The program stored on the recording medium may be compressed or not be compressed. The program is installed from the recording medium to the hard disk drive 1540, read to the RAM 1520 and executed by the CPU 1505.

The program executed by the CPU 1505 causes the album creating apparatus 10 to function as the image input device 110 and the album creating device 120. Additionally, the program causes the image input device 140 to function as the specified subject information acquiring section 2000 and the image acquiring section 202, and causes the album creating device to function as the specified subject information acquiring section 200, the image storage section 210, the reference time acquiring section 220, the image capturing timing specifying section 222, the color pallet selecting section 230, the color pallet storage section 232, the color used selecting section 234, the applied color storage section 236, the characteristic color extracting section 238, the pre-image selecting section 240, the specified subject image determining section 242, the post-image selecting section 250, the image classification section 260, the title determining section 270, the title storage section 272, the template storage section 280 and the album creating section 290.

The above-described program may be stored in an external storage medium. The recording medium may be, in addition to the flexible disk 1590 and the CD-ROM 1595, an optical storage medium such as a DVD and a PD, a magneto-optical recording medium such as a MD, a tape medium and a semiconductor memory such as an IC card. Additionally, a storage medium such as a hard disk or a RAM which is provided in the server system connected to a private communication network or Internet is used as the recording medium to provide the program to the album creating apparatus 100 through the network.

While the present invention has been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

BRIEF DESCRIPTION OF THE DRAWINGS

FIG. 5 shows an example of content of specified subject information;

FIG. 6 shows an example of character strings used for a title;

FIG. 7 shows an example of extracting method of extracting a characteristic color by the characteristic color extracting section 238;

Figure 1:
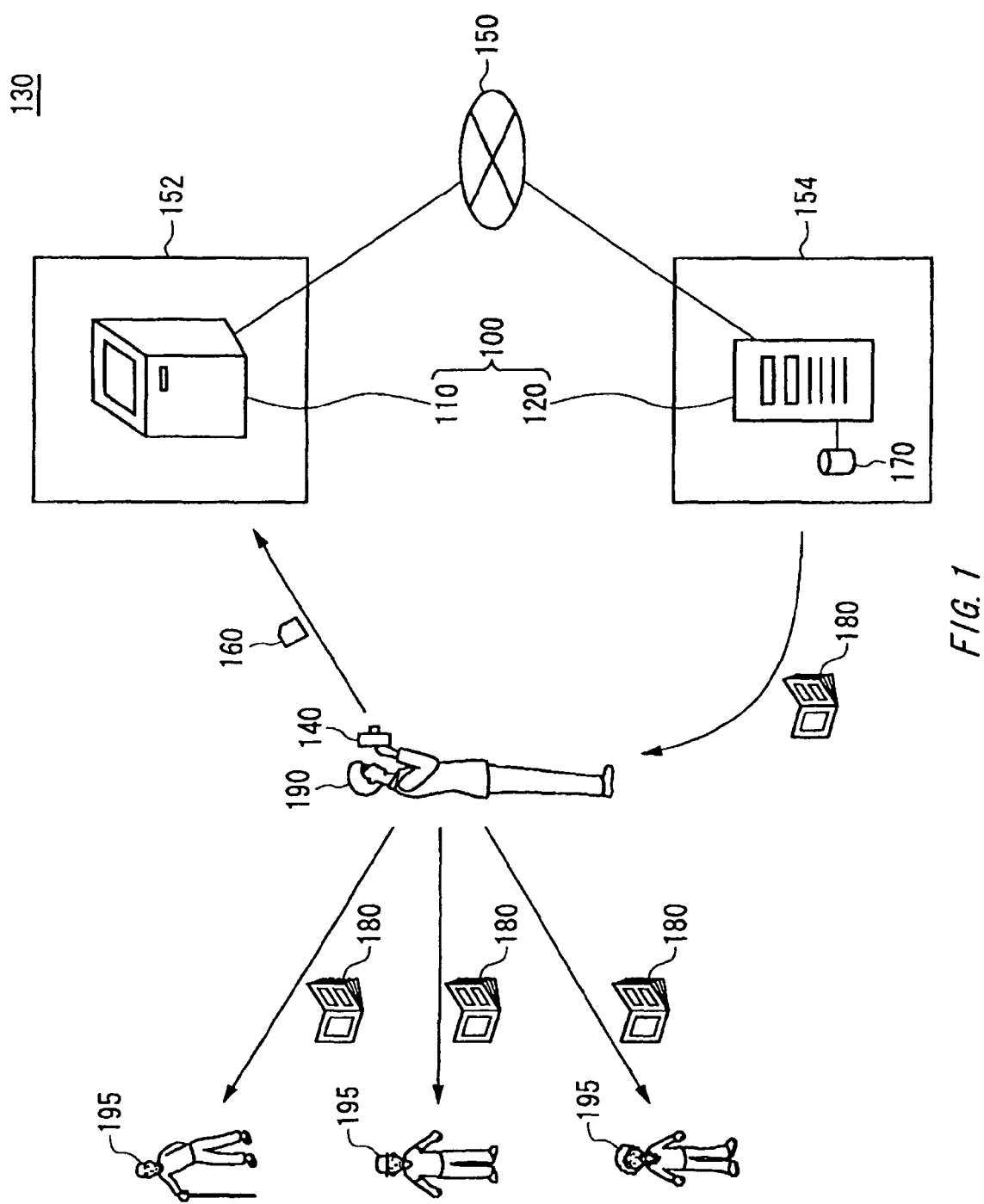
FIG. 1 shows an example of environment for the usage of the album creating apparatus 100.
Figure 2:
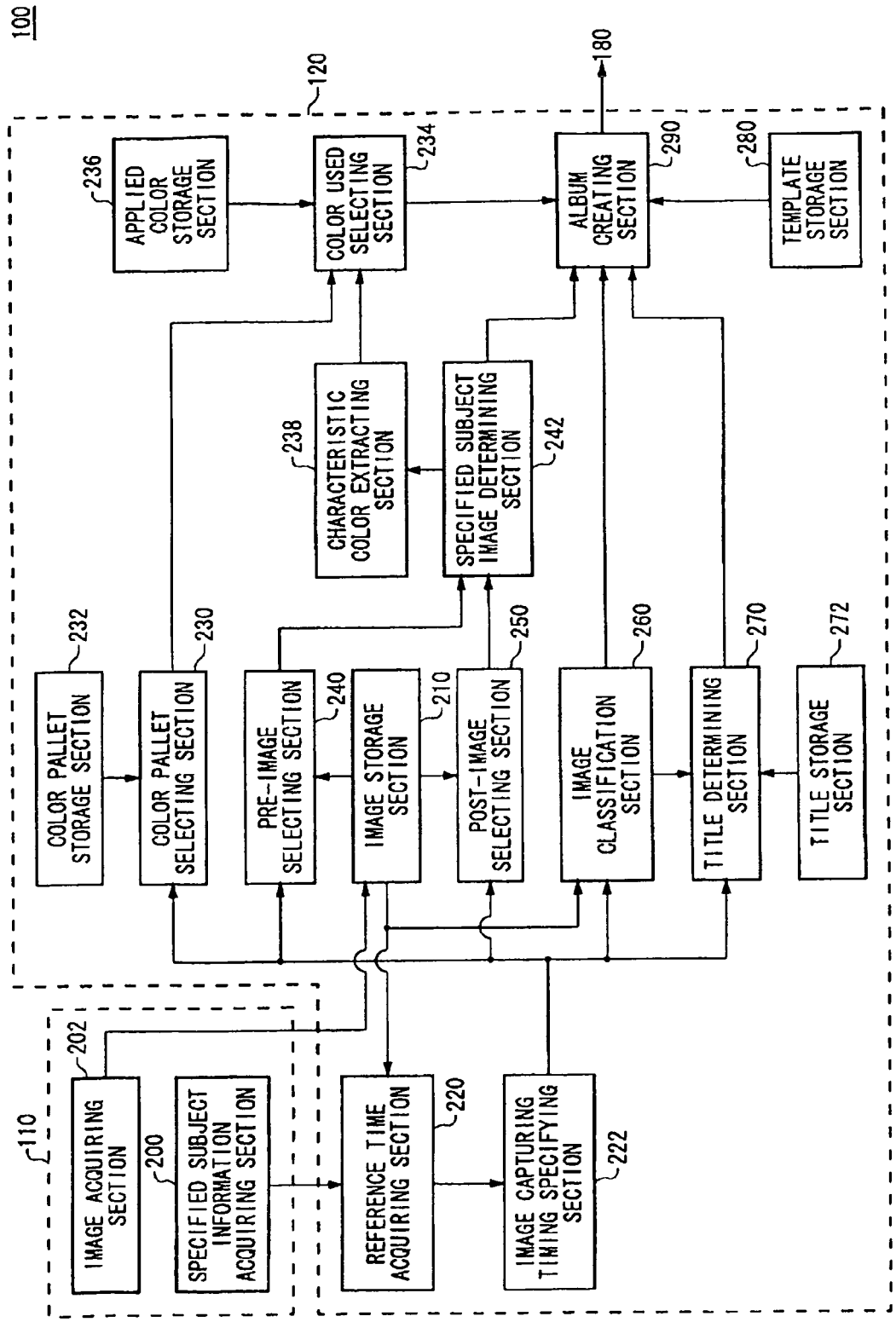
FIG. 2 shows an example of block configuration of the album creating apparatus 100.
Figure 3:
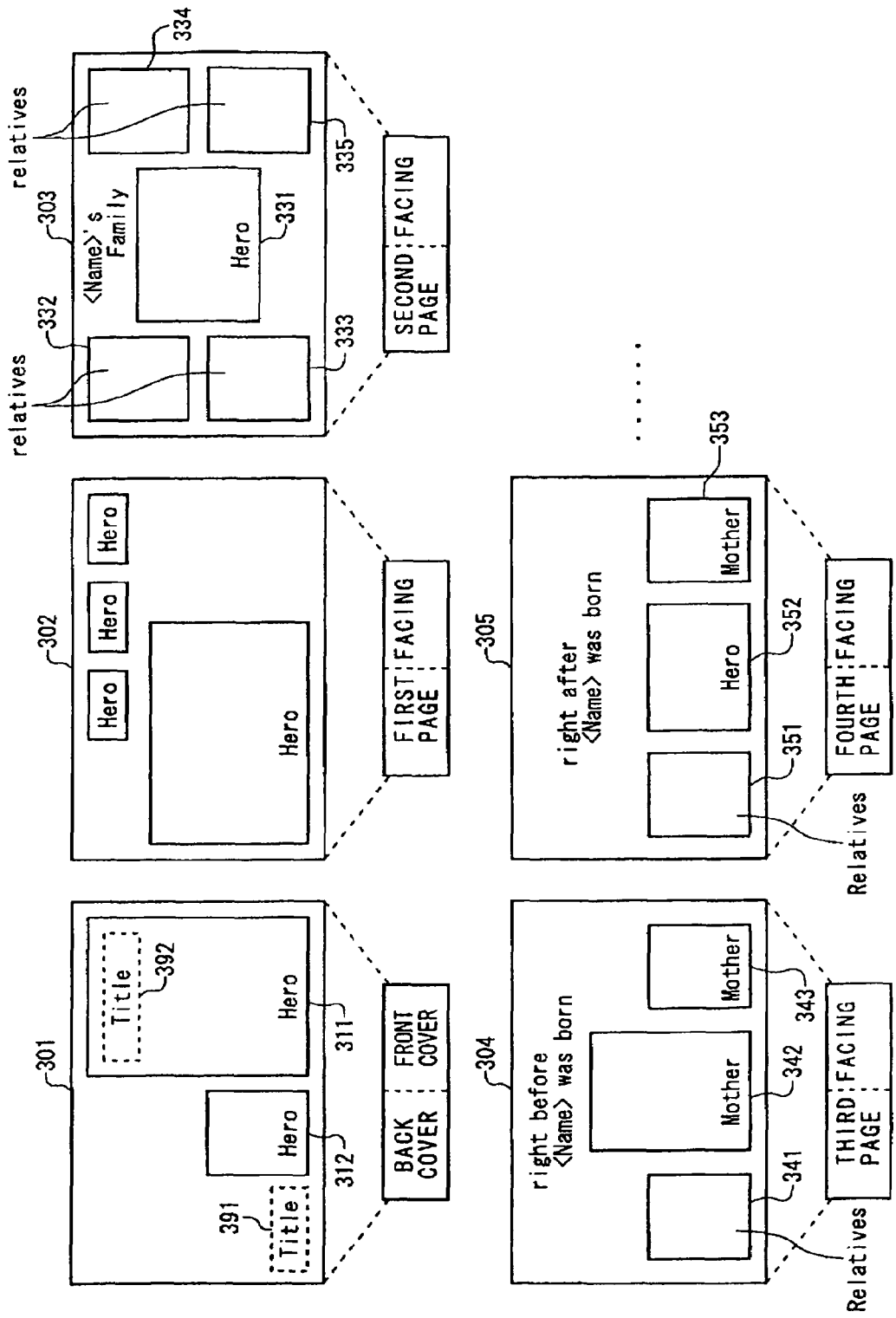
FIG. 3 shows an example of template.
Figure 4:
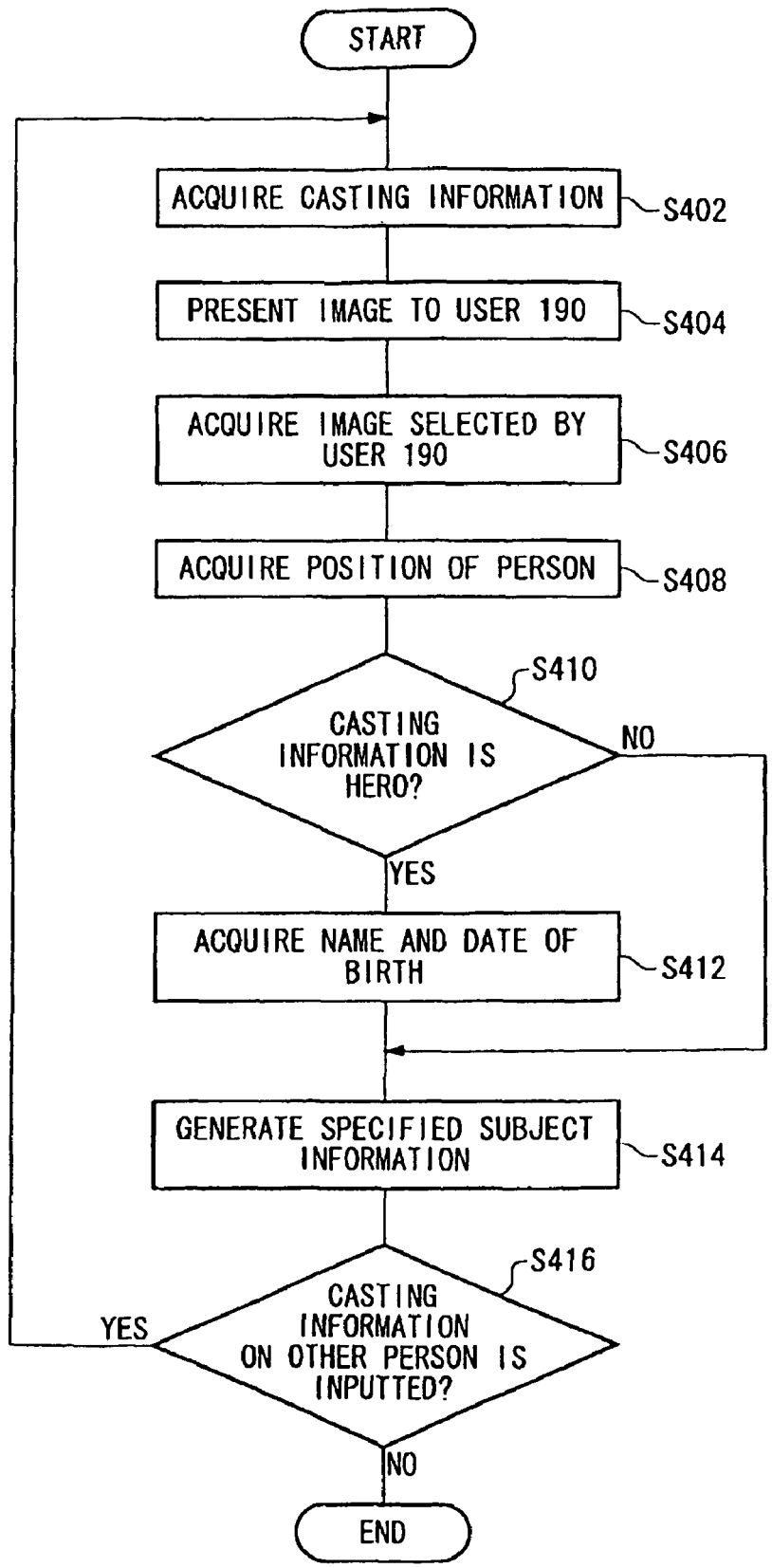
FIG. 4 shows an example of processing flow of acquiring specified subject information by the specified subject information acquiring section 200.
Figure 8:
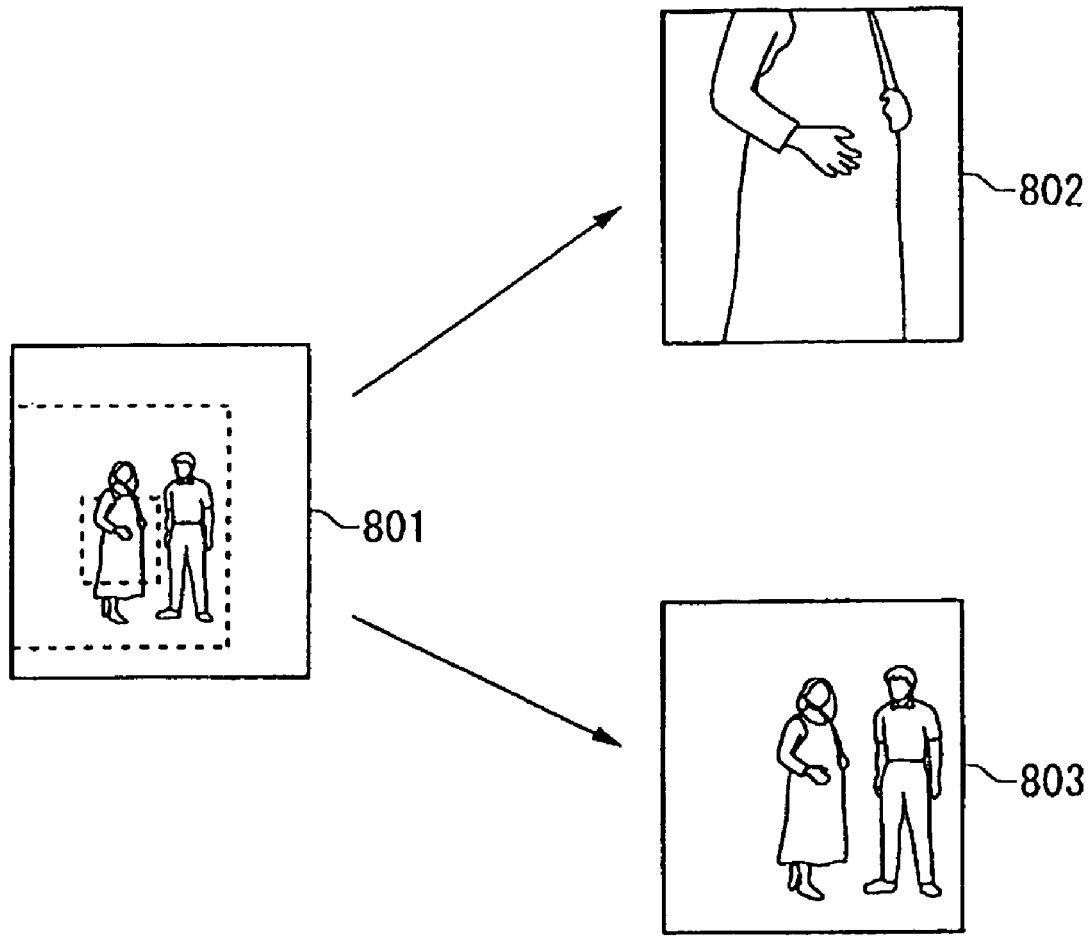
FIG. 8 shows an example of trimming images.
Figure 9:
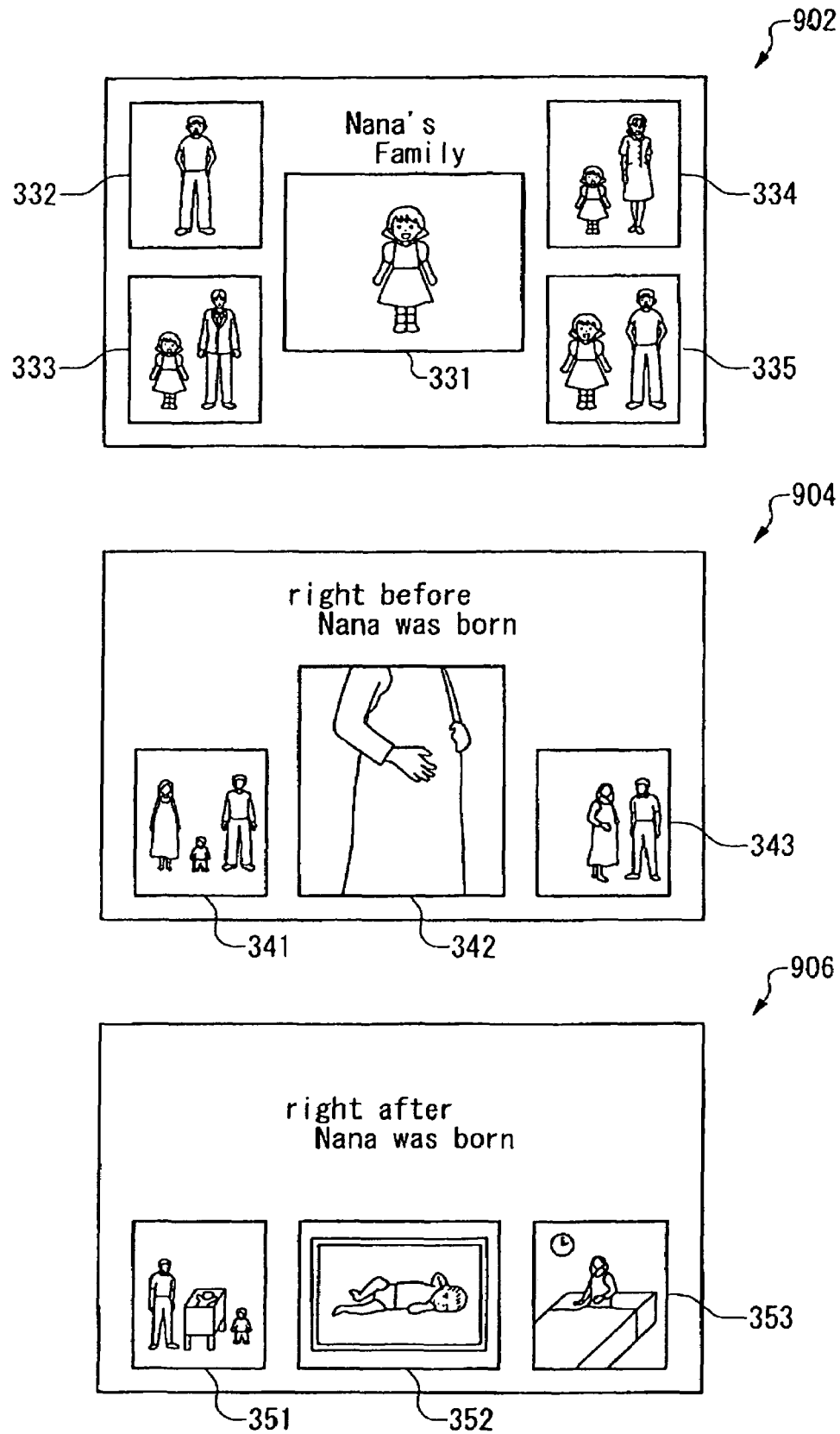
FIG. 9 shows an example of layout result in the album.
Figure 10:
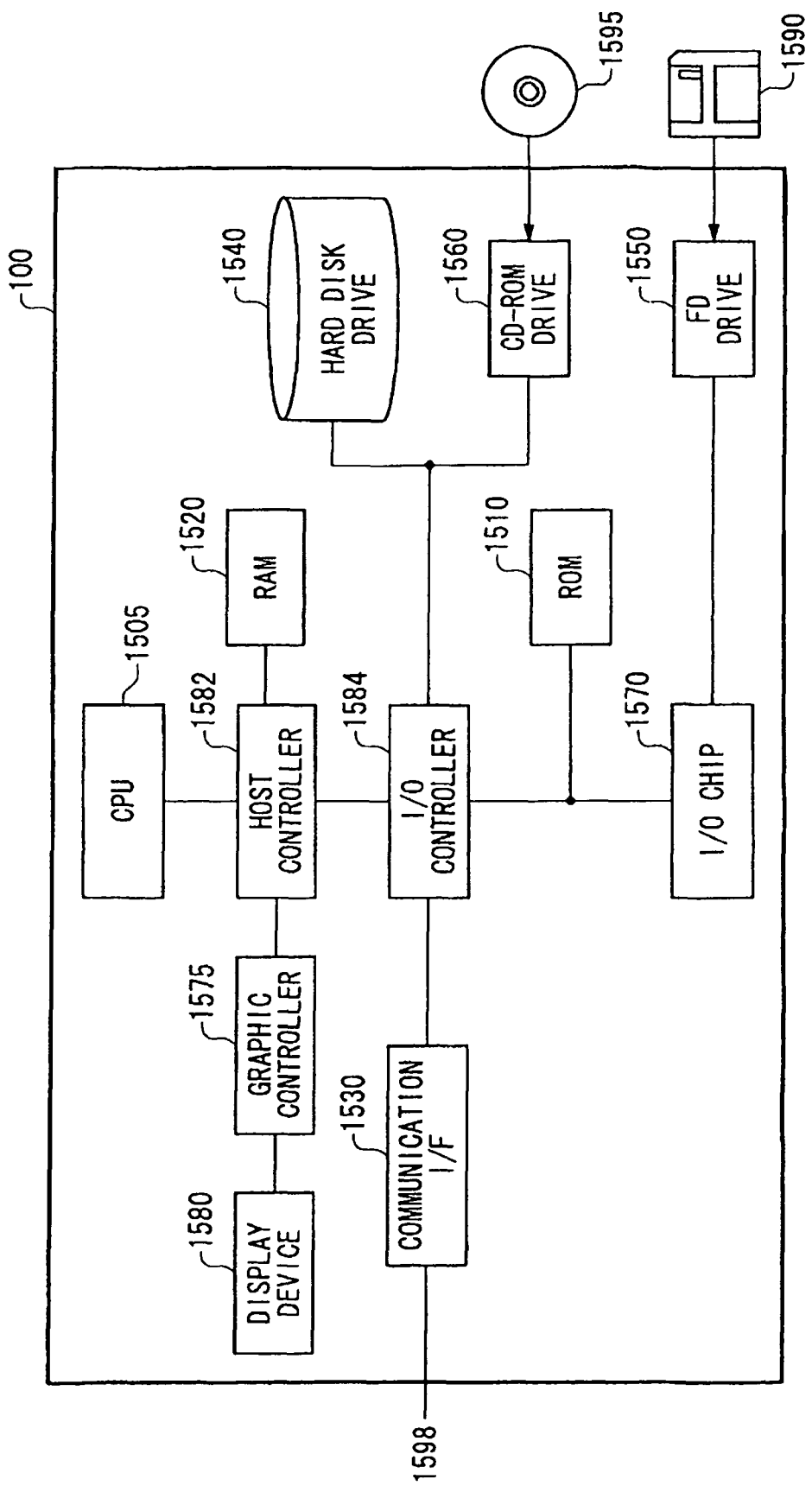
FIG. 10 shows an example of hardware configuration of the album creating apparatus 100.

The invention claimed is:

1. An album creating apparatus comprising:
an image acquiring section for acquiring a plurality of images in association with image capturing time and dates;
a specified subject information acquiring section for acquiring specified subject information including a specified subject image being an image of a first subject related to the main character in an album at a reference time indicative of the time and date of a main event in the album and a time before the reference time;

a pre-image selecting section for selecting the image acquired by the image acquiring section in association with an image capturing time and date before the reference time based on the image capturing time and dates of the plurality of images acquired by the image acquiring section and the reference time acquired by the specified subject information acquiring section;

a specified subject image determining section for determining whether the image selected by the pre-image selecting section includes the first subject related to the main character by comparing the image selected by the image selecting section with the specified subject image acquired by the specified subject information acquiring section; and an album creating section for creating the album with emphasizing the image determined by the specified subject image determining section as that the first subject related to the main character is included therein, wherein the specified subject information acquiring section acquiring specified subject information including a specified subject image being an image of a second subject related to the main character in the album at the reference time indicative of the time and date of the main event in the album and a time after the reference time, the album creating apparatus further comprising a post-image selecting section for selecting the image acquired by the image acquiring section in association with an image capturing time and date after the reference time based on the image capturing time and dates of the plurality of images acquired by the image acquiring section and the reference time acquired by the specified subject information acquiring section, the specified subject image determining section determining whether the image selected by the image selecting section includes the second subject related to the main character by comparing the image selected by the image selecting section with the specified subject image acquired by the specified subject information acquiring section, and the album creating section creating the album with emphasizing the image determined by the specified subject image determining section as that the second subject related to the main character is included therein.

2. The album creating apparatus as set forth in claim 1, wherein the specified subject information acquiring section acquiring specified subject information including the image of the parent of the main character and the birthday of the main character, the pre-image selecting' section selecting the image acquired by the image acquiring section in association with an image capturing time and date before the birthday of the main character based on the image capturing time and dates of the plurality of images acquired by the image acquiring section and the birthday of the main character acquired by the specified subject information acquiring section, the specified subject image determining section determining whether the image selected by the image selecting section includes the parent of the main character by comparing the image selected by the image selecting section with the image of the parent of the main character acquired by the specified subject information acquiring section, and the album creating section creates the album with emphasizing the image determined by the specified subject image determining section as that the parent of the main character is included therein.

3. The album creating apparatus as set forth in claim 2, wherein the specified subject information acquiring section further acquiring an image of the main character in the album, the album creating apparatus further comprising:

a post-image selecting section for selecting the image acquired by the image acquiring section in association with an image capturing time and date after the birthday of the main character based on the image capturing time and dates of the plurality of images acquired by the image acquiring section and the birthday of the main character acquired by the specified subject information acquiring section; and a main character image determining section for determining whether the image selected by the image selecting section includes the main character by comparing the image selected by the post-image selecting section and the image of the main character acquired by the specified subject information acquiring section, the album creating section creating the album with emphasizing the image determined by the main subject image determining section as that the main character is included therein.

4. The album creating apparatus as set forth in claim 2, wherein the album creating section creating the album by determining a trimming range in which a characteristic portion of the subject related to the main character is emphasized in the image determined by the specified subject image determining section as that the subject related to the main character included therein and using a trimming image obtained by trimming the image by the determined trimming range.

5. The album creating apparatus as set forth in claim 4, wherein the specified subject information acquiring section acquiring specified subject information including an image of the mother of the main character in the album and the birthday of the main character, the pre-image selecting section selecting the image acquired by the image acquiring section in association with the image capturing time and date within a predetermined period before the birthday of the main character based on the image capturing time and dates of the plurality of images acquired by the image acquiring section and the birthday of the main character acquired by the specified subject information acquiring section, the specified subject image determining section determining whether the image selected by the image selecting section includes the mother of the main character by comparing the image selected by the image selecting section with the image of the mother of the main character acquired by the specified subject information acquiring section, and the album creating section creating the album by determining a trimming range in which the belly of the mother of the main character is emphasized in the image determined by the specified subject image determining section as that the mother of the main character is included therein and using a trimming image obtained by trimming the image by the determined trimming range.

6. The album creating apparatus as set forth in claim 2, wherein the album creating section creating the album by selecting the image in which the characteristic portion of the subject related to the main character is located at the center thereof among the images determined by the specified subject image determining section as that the subject related to the main character is included therein and using the selected image.

7. The album creating apparatus as set forth in claim 6, wherein the specified subject information acquiring section acquiring specified subject information including the image of the main character in the album, the image of the mother of the main character and the birthday of the main character, the pre-image selecting section selecting the image acquired by the image acquiring section in association with an image capturing time and date within a predetermined period before the birthday of the main character based on the image capturing time and dates of the plurality of images acquired by the image acquiring section and the birthday of the main character acquired by the specified subject information acquiring section, the specified subject image determining section determining whether the image selected by the image selecting section includes the mother of the main character by comparing the image selected by the image selecting section with the image of the mother of the main character acquired by the specified subject information acquiring section, and the album creating section creating the album by selecting the image in which the belly of the mother of the main character is located at the center thereof among the images determined by the specified subject image determining section as that the mother of the main character is included therein.

8. An image creating method comprising:

acquiring a plurality of images in association with image capturing time and dates;

acquiring specified subject information including a specified subject image being an image of a first subject related to the main character in an album at a reference time indicative of the time and date of a main event in the album and a time before the reference time;

selecting the image acquired in the image acquiring step in association with an image capturing time and date before the reference time based on the image capturing time and dates of the plurality of images acquired in the image acquiring step and the reference time acquired in the specified subject information acquiring step;

determining whether the image selected in the pre-image selecting step includes the first subject related to the main character by comparing the image selected in the image selecting step with the specified subject image acquired in the specified subject information acquiring step; and creating the album with emphasizing the image determined in the specified subject image determining step as that the first subject related to the main character is included therein, wherein acquiring specified subject information including a specified subject image being an image of a second subject related to the main character in the album at the reference time indicative of the time and date of the main event in the album and a time after the reference time, selecting the image acquired by the image acquiring section in association with an image capturing time and date after the reference time based on the image capturing time and dates of the plurality of images acquired by the image acquiring section and the reference time acquired by the specified subject information acquiring section, determining whether the image selected by the image selecting section includes the second subject related to the main character by comparing the image selected by the image selecting section with the specified subject image acquired by the specified subject information acquiring section, and emphasizing the image determined by the specified subject image determining section as that the second subject related to the main character is included therein.

9. A non-transitory computer readable medium storing thereon a program for an album creating apparatus for creating an album, the program causing the album creating apparatus to function as:

an image acquiring section for acquiring a plurality of images in association with image capturing time and dates;

a specified subject information acquiring section for acquiring specified subject information including a specified subject image being an image of a first subject related to the main character in an album at a reference time indicative of the time and date of a main event in the album and a time before the reference time;

a pre-image selecting section for selecting the image acquired by the image acquiring section in association with an image capturing time and date before the reference time based on the image capturing time and dates of the plurality of images acquired by the image acquiring section and the reference time acquired by the specified subject information acquiring section;

a specified subject image determining section for determining whether the image selected by the pre-image selecting section includes the first subject related to the main character by comparing the image selected by the image selecting section with the specified subject image acquired by the specified subject information acquiring section; and an album creating section for creating the album with emphasizing the image determined by the specified subject image determining section as that the first subject related to the main character is included therein, wherein the specified subject information acquiring section acquiring specified subject information including a specified subject image being an image of a second subject related to the main character in the album at the reference time indicative of the time and date of the main event in the album and a time after the reference time, the album creating apparatus further comprising a post-image selecting section for selecting the image acquired by the image acquiring section in association with an image capturing time and date after the reference time based on the image capturing time and dates of the plurality of images acquired by the image acquiring section and the reference time acquired by the specified subject information acquiring section, the specified subject image determining section determining whether the image selected by the image selecting section includes the second subject related to the main character by comparing the image selected by the image selecting section with the specified subject image acquired by the specified subject information acquiring section, and the album creating section creating the album with emphasizing the image determined by the specified subject image determining section as that the second subject related to the main character is included therein.

* * * * *